US012744264B2

(12) United States Patent
Juzkow et al.

(10) Patent No.: US 12,744,264 B2
(45) Date of Patent: Sep. 22, 2026

(54) BATTERY INTERCONNECTION SYSTEM

(71) Applicant: Joby Aero, Inc., Santa Cruz, CA (US)

(72) Inventors: Marc Juzkow, Livermore, CA (US); Edward Thomas Sweet, Burlingame, CA (US); Austin L. Newman, Castro Valley, CA (US); Pum Sang Cho, San Carlos, CA (US); Ernest Villanueva, San Francisco, CA (US); JoeBen Bevirt, Santa Cruz, CA (US); Luigi Abbate, Redwood City, CA (US); Jon Wagner, Belmont, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 566 days.

(21) Appl. No.: 18/187,168

(22) Filed: Mar. 21, 2023

(65) Prior Publication Data

US 2023/0299380 A1 Sep. 21, 2023

Related U.S. Application Data

(60) Provisional application No. 63/322,040, filed on Mar. 21, 2022, provisional application No. 63/322,052, filed on Mar. 21, 2022.

(51) Int. Cl.
*H01M 10/654* (2014.01)
*H01M 10/0585* (2010.01)
(Continued)

(52) U.S. Cl.
CPC ..... *H01M 10/654* (2015.04); *H01M 10/0585* (2013.01); *H01M 10/613* (2015.04);
(Continued)

(58) Field of Classification Search
CPC ............. H01M 10/654; H01M 10/613; H01M 10/647; H01M 10/6554; H01M 10/6556;
(Continued)

(56) References Cited

U.S. PATENT DOCUMENTS 10,629,915 B2 * 4/2020 Dawley ............... H01M 10/045
11,189,872 B2 * 11/2021 Drews ............... H01M 10/6554
(Continued)

FOREIGN PATENT DOCUMENTS

KR 20090051870 A * 5/2009 .......... H01M 50/105
KR 20110105945 9/2011
(Continued)

OTHER PUBLICATIONS

KR 20090051870 English Translation (Year: 2009).*
(Continued)

*Primary Examiner* — Jimmy Vo
(74) *Attorney, Agent, or Firm* — SCHWEGMAN LUNDBERG & WOESSNER, P.A.

(57) ABSTRACT

A battery interconnection system incorporating a temperature control mechanism having a first battery cell and a second battery cell is provided. The first battery cell has an electrically positive tab and an electrically negative tab. The second battery cell has an electrically positive tab and a electrically negative tab. The electrically positive tab of the first battery cell couples with the electrically positive tab of the second battery cell. Moreover, the electrically negative tab of the first battery cell couples with the electrically negative tab of the second battery cell. The first battery cell includes a cathode electrically coupled with the electrically positive tab of the first battery cell and the second battery cell includes a cathode electrically coupled with the electrically positive tab of the second battery cell. The first battery cell also has an anode electrically coupled with the a electrically negative tab of the first battery cell and the second battery cell has an anode electrically coupled with the electrically negative tab of the second battery cell.

11 Claims, 10 Drawing Sheets

(51) Int. Cl.

| | |
|---|---|
| ***H01M 10/613*** | (2014.01) |
| ***H01M 10/647*** | (2014.01) |
| ***H01M 10/6554*** | (2014.01) |
| ***H01M 10/6556*** | (2014.01) |
| ***H01M 50/105*** | (2021.01) |
| ***H01M 50/112*** | (2021.01) |
| ***H01M 50/121*** | (2021.01) |
| ***H01M 50/124*** | (2021.01) |
| ***H01M 50/186*** | (2021.01) |
| ***H01M 50/193*** | (2021.01) |
| ***H01M 50/512*** | (2021.01) |
| ***H01M 50/531*** | (2021.01) |

(52) U.S. Cl.

CPC ..... *H01M 10/647* (2015.04); *H01M 10/6554* (2015.04); *H01M 10/6556* (2015.04); *H01M 50/105* (2021.01); *H01M 50/112* (2021.01); *H01M 50/121* (2021.01); *H01M 50/124* (2021.01); *H01M 50/1243* (2021.01); *H01M 50/186* (2021.01); *H01M 50/193* (2021.01); *H01M 50/512* (2021.01); *H01M 50/531* (2021.01)

(58) Field of Classification Search

CPC ........... H01M 10/0585; H01M 50/186; H01M 50/121; H01M 50/124; H01M 50/531; H01M 50/105; H01M 50/193; H01M 50/1243; H01M 50/112; H01M 50/512

See application file for complete search history.

(56) References Cited

U.S. PATENT DOCUMENTS

| | | | | |
|---|---|---|---|---|
| 2003/0180609 | A1 | 9/2003 | Yamashita et al. | |
| 2014/0154401 | A1 | 6/2014 | Salot et al. | |
| 2017/0194606 | A1 | 7/2017 | Lim et al. | |
| 2018/0219191 | A1 | 8/2018 | Drews et al. | |
| 2020/0227794 | A1 | 7/2020 | Mazza et al. | |
| 2020/0274208 | A1* | 8/2020 | Sucke | H01M 10/613 |
| 2021/0184292 | A1* | 6/2021 | Park | H01M 10/613 |
| 2022/0115711 | A1* | 4/2022 | Busacca | H01M 10/044 |
| 2023/0299382 | A1 | 9/2023 | Juzkow et al. | |

FOREIGN PATENT DOCUMENTS

| | | | | | |
|---|---|---|---|---|---|
| KR | 101446149 | B1 | * | 10/2014 | H01M 10/625 |
| KR | 20160080559 | | | 7/2016 | |
| KR | 20160080559 | A | * | 7/2016 | H01M 50/1243 |

OTHER PUBLICATIONS

"International Application Serial No. PCT US2023 064747, International Search Report mailed Jul. 10, 2023", 5 pgs.
"International Application Serial No. PCT US2023 064747, Written Opinion mailed Jul. 10, 2023", 8 pgs.
"International Application Serial No. PCT US2023 064747, International Preliminary Report on Patentability mailed Oct. 3, 2024", 10 pgs.
"European Application Serial No. 23720503.4, Response filed Apr. 24, 2025 to Communication pursuant to Rules 1611 and 162 EP", w claims, 12 pgs.
"U.S. Appl. No. 18/187,167, Non Final Office Action mailed Oct. 23, 2025", 28 pgs.
"U.S. Appl. No. 18/187,167, Notice of Allowance mailed Mar. 10, 2026", 12 pgs.
"U.S. Appl. No. 18/187,167, Corrected Notice of Allowability mailed Mar. 17, 2026", 3 pgs.
"U.S. Appl. No. 18/187,167, Examiner Interview Summary mailed Jan. 23, 2026", 2 pgs.
"U.S. Appl. No. 18/187,167, Response filed Jan. 23, 2026 to Non Final Office Action mailed Oct. 23, 2025", 10 pgs.
"U.S. Appl. No. 18/187,167, Corrected Notice of Allowability mailed May 7, 2026", 3 pages.
"U.S. Appl. No. 18/187,167, Corrected Notice of Allowability mailed Jun. 15, 2026", 3 pages.

* cited by examiner

BATTERY INTERCONNECTION SYSTEM

CLAIM FOR PRIORITY

The present application claims priority to U.S. Provisional Patent Application Nos. 63/322,052, filed on Mar. 21, 2022, and 63/322,040, filed on Mar. 21, 2022, the contents of which are incorporated herein in their entirety.

TECHNICAL FIELD

Examples of the present disclosure relate generally to battery cells and, more particularly, but not by way of limitation, to an interconnection system for battery cells.

BACKGROUND

Typically, rechargeable batteries are for loads having high energy requirements. Examples can include vehicles such as automobiles and aeronautical vehicles. During recharging, a temperature of the battery can be increased in order to decrease impedance to improve fast charging. Moreover, during use, such as flight in aeronautical applications, the temperature of the battery naturally increases. However, the increased temperature of the battery over time can decrease the lifespan of the battery. Thus, the battery should be cooled in order to increase the lifespan of the battery.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody, illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Examples can relate to lithium-ion, lithium metal, or a similar rechargeable battery chemistry. Regardless of the chemistry, the battery can use an aluminum foil-polymer laminate for containment. Moreover, the battery cells in accordance examples can allow for flexible packaging. Each of the battery cells can be formed such that positive and negative tabs extend from each of the battery cells. Here, the battery cells electrically couple to each other via the tabs. In one configuration, the battery cells can include four tabs, where two of the tabs can electrically couple with a cathode within the battery cell and two of the tabs can couple with an anode within the battery cell to respectively form positive and negative tabs.

Battery cells can be coupled to each other in parallel via the tabs. More specifically, a positive tab of a first battery cell can couple with a positive tab of a second battery cell. Additionally, a negative tab of the first battery cell can couple with a negative tab of the second battery cell. Where more than two battery cells are coupled in parallel, the positive tab of the second battery cell can couple with a positive tab of a third battery cell. Furthermore, the negative tab of the second battery cell can couple with a negative tab of a third battery cell.

Each battery cell can be disposed within a pouch formed of several layers. Thus, the first battery cell can be disposed within a first pouch laminate, the second battery cell can be disposed within a second pouch laminate, and the third battery cell can be disposed within a third pouch laminate. Each of the battery cells, such as the first, second, and third battery cells, can be disposed within the same pouch laminate. In these examples, the anodes and cathodes formed in each of the battery cells can be formed with a punch through process. Regardless of whether or not the battery cells are disposed within individual pouch laminates or the same pouch laminate, by coupling each of the battery cells via the negative and the positive tabs as described herein, the requirement of bus bars to electrically couple the battery cells can be eliminated.

Figure 1:
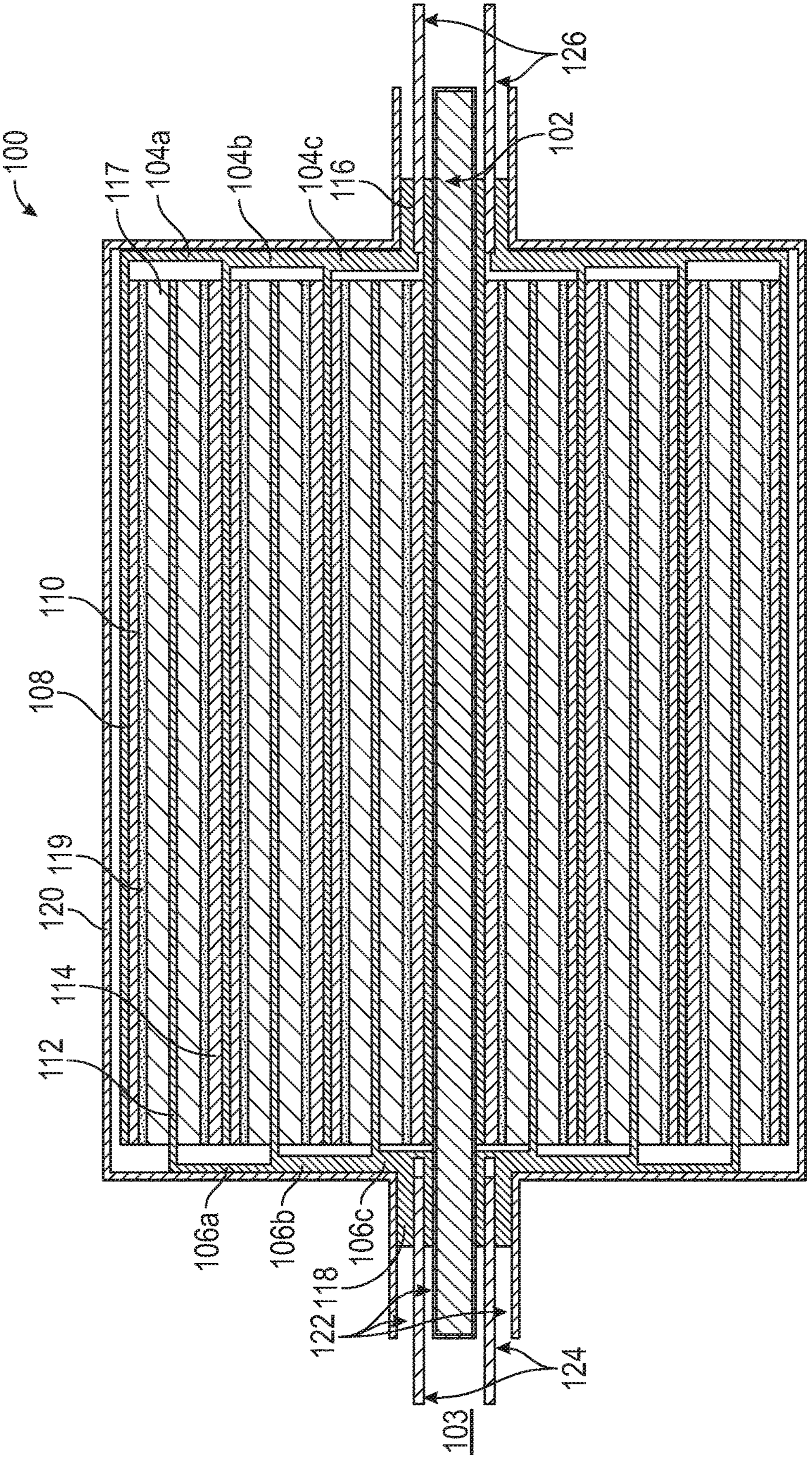
FIG. 1 illustrates a battery cell, according to some examples.

Now making reference to FIG. 1, a battery cell 100 that includes a temperature control mechanism 102 in shown, in accordance with examples. The battery cell 100 can be a lithium liquid system. As may be seen with reference to FIG. 1, the temperature control mechanism 102 can be formed in a central location 103 of the battery cell 100. By virtue of the central location 103 within the battery cell 100, the temperature control mechanism 102 can provide the advantages discussed above.

Figure 2:
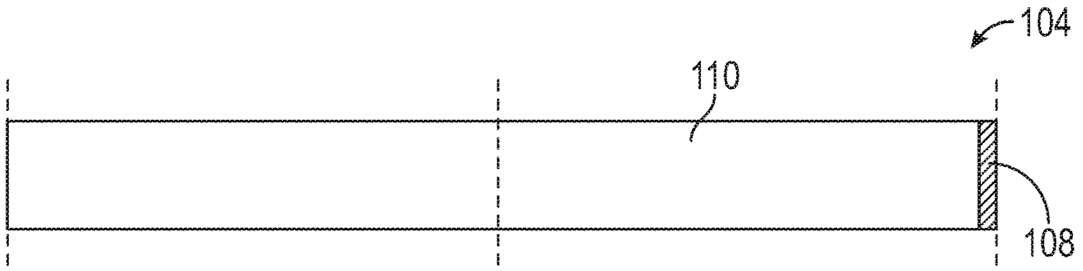
FIGS. 2 and 3 illustrate the formation of anodes and cathodes for the battery cell of FIG. 1, according to some examples.

The battery cell 100 can include anodes 104 along with cathodes 106 that can function to generate an electrical current to power an external load. In examples, an anode 104 (also shown in FIG. 2) can include a current collecting portion 108 along with an active area 114, which can be formed as a coating on the current collecting portion 108. As can be seen with reference to FIG. 2, the anode 104 can be defined by the collecting portion 108 where the active area 114 can be formed on the current collecting portion 108. A liquid slurry that comprises the active area 114 can be deposited onto the current collecting portion 108 where the resultant structure is subjected to a drying process. The current collecting portion 108 can be formed of any type of conductive material, such as copper, nickel or the like. Moreover, the active area 114 can be formed of any type of anode material that has high energy density, high power density, and a long cycle life. Examples can include graphite, a combination of graphite and Si/C, Si or Si, or the like. The anode 104 can also be a sheet of lithium metal, where the metal foil acts as both the active material and the current collector (not shown) or lithium metal plated onto a current collector.

Figure 3:
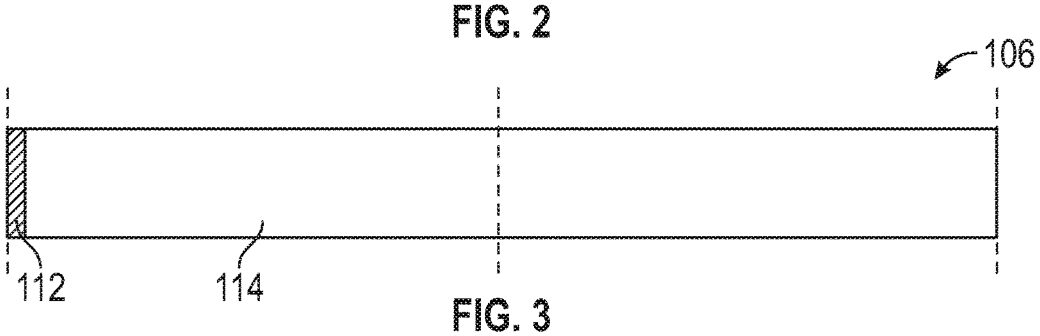

The cathode 106 can include a current collector portion 112 along with an active area 117, which can be formed as a coating on the current collecting portion 112, as more clearly shown with reference to FIG. 3. Similar to the anode 104, the cathode 106 can be defined by the current collecting portions 112 where the active area 117 can be formed on the current collecting portion 112. A liquid slurry that has the active area 117 can be deposited onto the current collecting portion 112 where the resultant structure is subjected to a drying process. The current collector portion 112 can be formed of any type of conductive material, such as aluminum, or the like. The current collector portion 112 can also be formed of copper, nickel, cobalt, manganese, or the like. Additionally, the active area 117 can be formed of any type of cathode material that has high energy density, high power density, and a long cycle life.

Returning attention to FIG. 1, each of the current collectors from the anodes 108*a-c* can be fused together, shown as 116. Similarly, each of the current collectors from cathodes 112*a-c* can be fused together, shown as 118. The anodes 104*a-c* and the cathodes 106*a-c* can be fused using a welding technique. Moreover, by virtue of forming the collection of anode current collectors 116 and cathode current collectors 118, parallel electrodes can be formed. In addition, the battery cell 100 can include a cathode/catholyte layer 117 and a solid-state electrolyte layer 119. The solid-state electrolyte layer 119 can function as a separator between the cathode/catholyte layer 117 and the anode 104. The structure of the cathode/catholyte layer 117 and the solid-state electrolyte layer 119 can repeat throughout the battery cell where the pattern repeats such that each repeating layer is a mirror image of the previous layer.

The design of the battery cell 100 shown with reference to FIG. 1 can work with a pouch laminate 120. The pouch laminate 120 can include multiple layers, such as a layer of aluminum, a layer of nylon, a Polyethylene terephthalate (PET) layer, and a sealant layer of co-polymer polypropylene and polyethylene (CPP), polypropylene, polypropylene/polyphthalamide or the like formed on an inside surface of the pouch laminate 120. The pouch laminate 120 can be formed into a cup in order to fit over the electrode stack. The pouch laminate 120 can seal directly with the temperature control mechanism 102 via the sealant layer on all sides of the pouch laminate 120. Moreover, the temperature control mechanism 102 can be centrally located within the pouch laminate 120, as shown with reference to FIG. 1.

Figure 4:
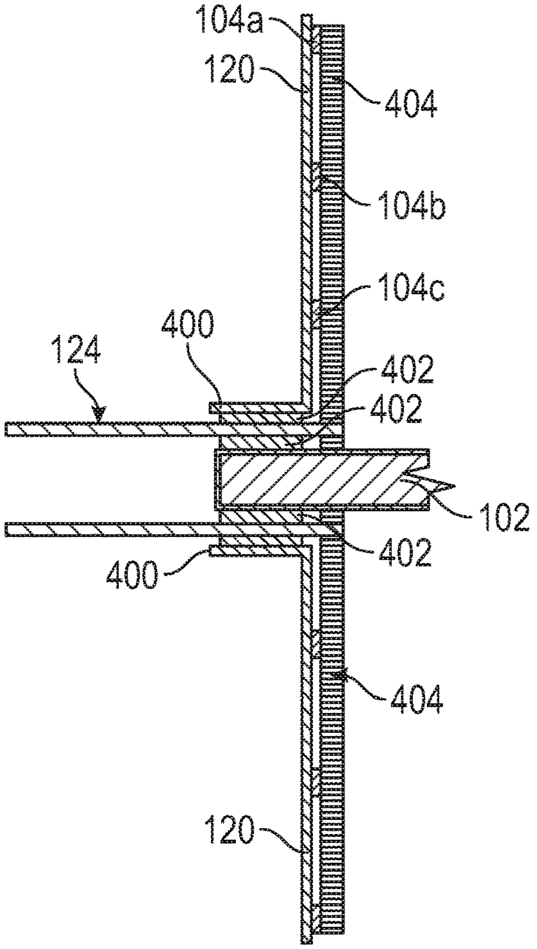
FIGS. 4 and 5 illustrate the formation of a top seal with external electrical tabs, according to some examples.

Making reference to FIG. 4, the pouch laminate 120 can be heat sealed over external tabs 124 at a shelf 400 where portions of the pouch laminate 120 form a shelf during a cup formation process. The shelf 400 can be on both sides of the external tabs 124, as shown with reference to FIG. 4. The temperature control mechanism 102 also has a sealant layer 402 which is heat fused to the underside of the external tabs 124. The external tabs 124 can extend from the battery cell 100 where the sealant layer 402 can be disposed around the external tabs 124. The external tabs 124 can be formed from any conductive material, such as nickel, nickel plated copper, aluminum or the like, and can function as an electrical lead extending from the battery cell 100. Thus, in examples, a load can couple with the battery cell 100 via the external tabs 124. In examples, a first layer of sealant can be disposed on an inner surface of the pouch laminate 120, a second layer of sealant can be disposed about both sides of the tabs 124, and a third layer of sealant can be disposed about the temperature control mechanism 102.

Each of the sealant layers can be heat fused such that the shelves 400 are in the position shown with reference to FIG. 4. Thus, the temperature control mechanism 102, the external tabs 124, and the shelf 400 of the pouch laminate 120 are sealed with each other via the sealant layers thereby forming a near hermetic seal.

Figure 5:
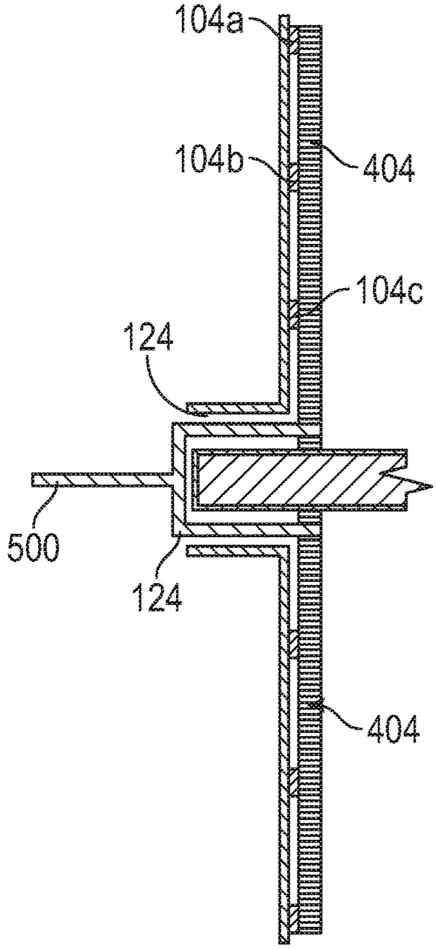

In some examples, such as configurations where one battery cell 100 couples with another battery cell 100 instead of directly to a load, the external tabs 124 can be fused into a single tab 500, as shown with reference to FIG. 5. In this example, the tab 500 can be configured to couple with another battery cell 100 instead of to a load.

Furthermore, in the example shown with reference to FIGS. 4 and 5, the battery cell 100 can include internal metal bus bars 404 (now 108). As described with reference to FIG. 1, each of the anodes 104*a*-104*c* (now 108*a*-108*c*) are fused to each other. In the example shown with reference to FIG. 4, instead of fusing the anodes 104*a*-104*c* (now 108*a*-108*c*) to each other to form the collection of anode current collectors 116, the anodes 104*a*-104*c* (now 108*a*-108*c*) are fused to the external metal bus bars 124. While not shown, the cathodes 106*a*-106*c* could also be fused to external metal bus bar 126 similar to the external metal bus bars 124.

As noted above, the temperature control mechanism 102 can include a layer of CPP disposed thereabout. Now making reference to FIGS. 6A-6D, the temperature control mechanism 102 can include sealant layer 600 disposed only about sides 602-608 of the temperature control mechanism 102. In particular, the sealant layer 600 is not disposed about a top surface 610 of the temperature control mechanism 102 nor a bottom surface 612 of the temperature control mechanism 102. However, in some examples, the sealant layer 600 can be disposed on the temperature control mechanism top surface 610 or on the temperature control mechanism bottom surface 612. Additionally, in some examples, the sealant layer 600 can be disposed on the temperature control mechanism top surface 610 and on the temperature control mechanism bottom surface 612. In examples, the sealant layer 600 can be melted onto the temperature control mechanism 102. Regardless of the positioning of the sealant layer 600 on the temperature control mechanism 102, the sealant layer 600 can be heat sealed with the sealant layer of the pouch laminate 120 to form a hermetic seal. The sealant layer 600 can be formed from CPP or a combination of polypropylene and Polyphthalamide.

Figure 6A:
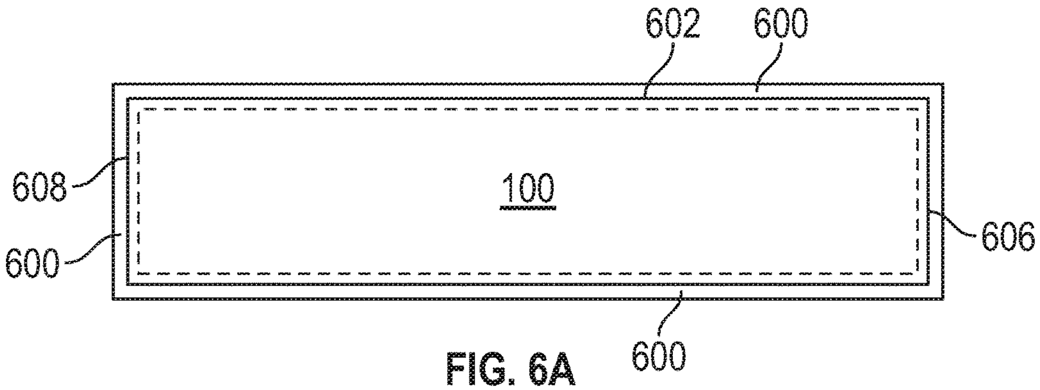
FIGS. 6A-6D illustrate a temperature control mechanism with dashed lines to outline an outer perimeter of an electrode stack such as that shown with reference to FIG. 1 onto a temperature control mechanism, according to some examples.
Figure 6B:
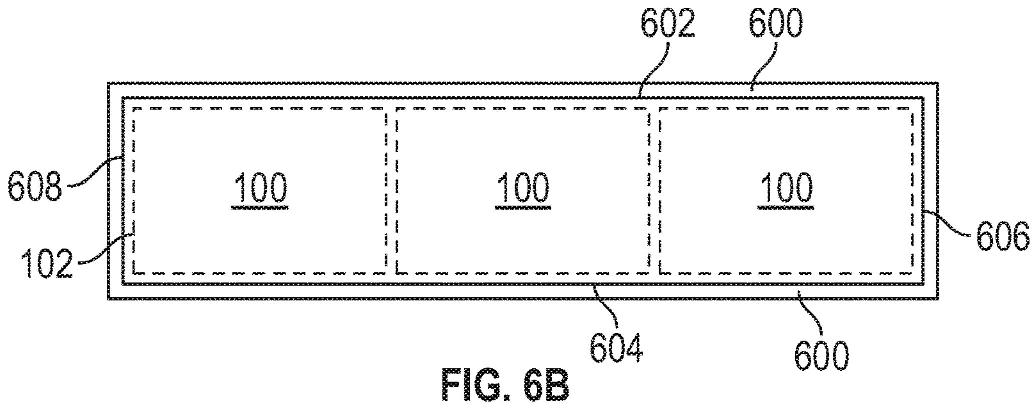
Figure 6C:
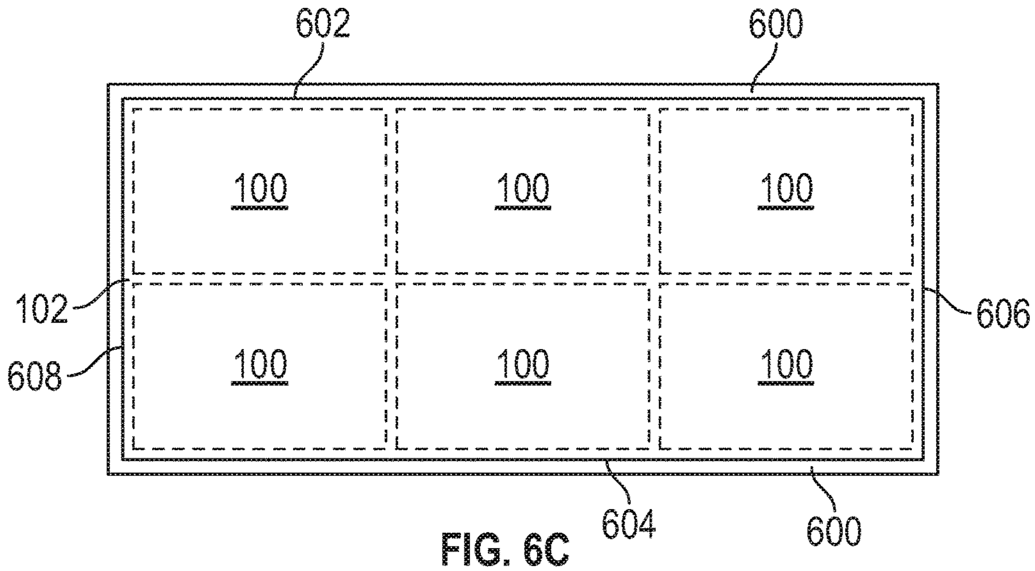
Figure 6D:
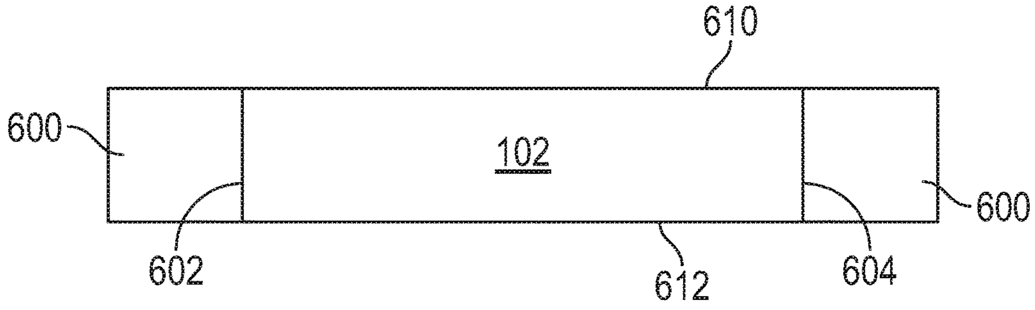

Moreover, as shown in FIGS. 6B and 6C, multiple battery cells 100 can be disposed on a single temperature control mechanism 102. For example, as shown in FIG. 6B, three battery cells 100 are disposed on the temperature control mechanism 102. In FIG. 6C, six battery cells 100 are disposed on the temperature control mechanism 102. While three and six battery cells 100 are shown disposed on a single temperature control mechanism 102, examples envision that any number of battery cells can be disposed on a single temperature control mechanism 102.

Figure 7A:
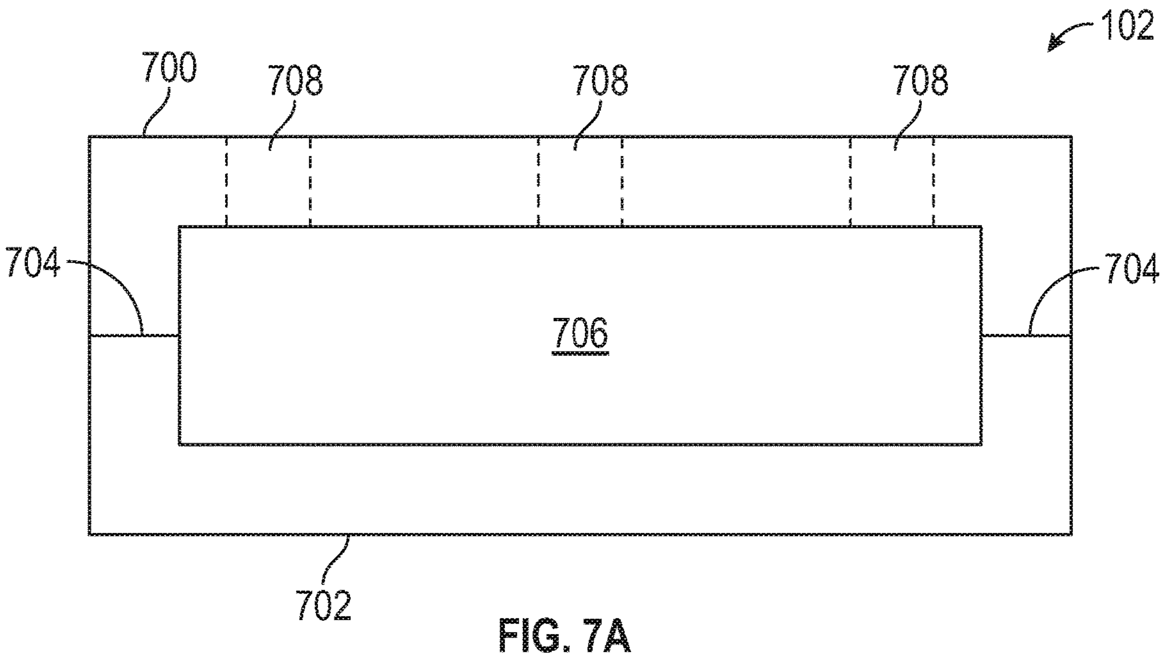
FIGS. 7A and 7B illustrate a temperature control mechanism for the battery cell of FIG. 1, according to some examples.
Figure 7B:
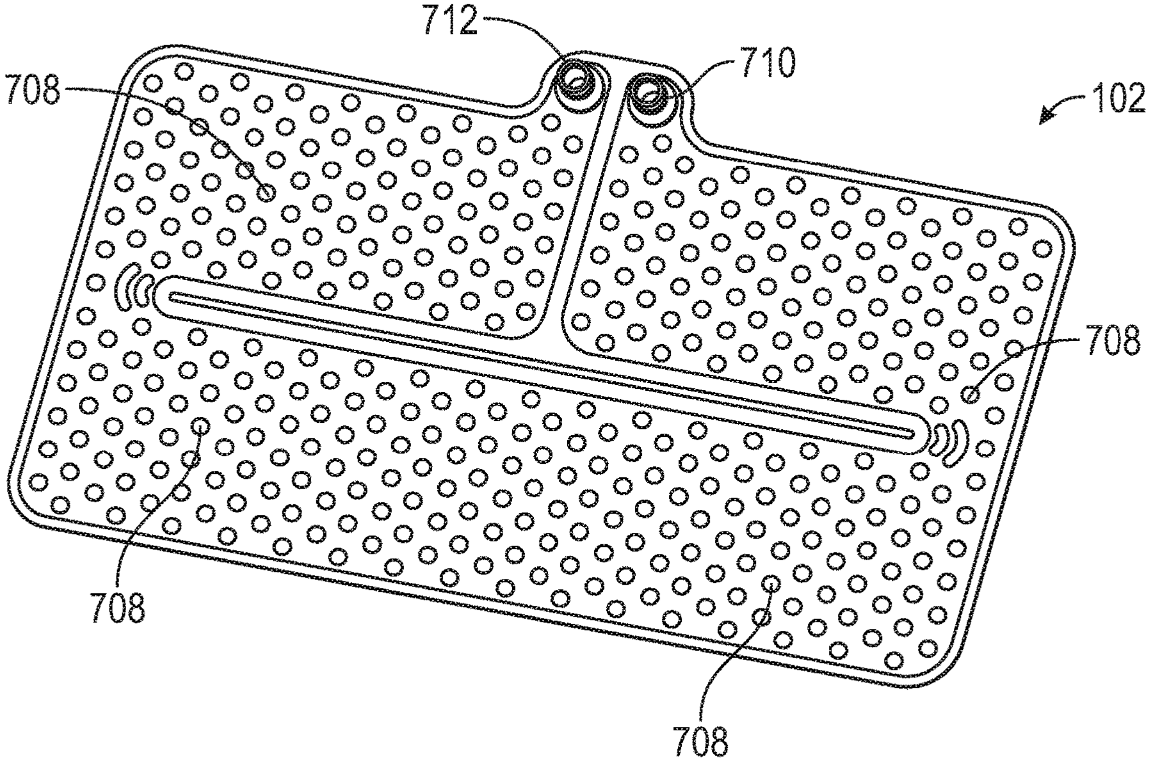

Now making reference to FIGS. 7A and 7B, the temperature control mechanism 102 can be configured to have a heat transfer fluid travel therethrough. More specifically, the temperature control mechanism 102 can include two hollow metal plates 700 and 702 welded to each other at edges 704 of the hollow metal plates 700 and 702. When the two hollow metal plates 700 and 702 are welded to each other, a sealed hollow cavity 706 can be formed between the hollow metal plates 700 and 702 where passageways 708 are disposed therein through which a heat transfer fluid can travel. The hollow metal plates 700 and 702 can be formed of metal in order to optimize thermal flow or a polymer. Example metals can include stainless steel, aluminum, titanium or the like. Example polymers can include polyolefins such as Polypropylene or HDPE, and PPS, PET, PEEK, polyimide, POM, PVC, PTFE, polyurethane, FEP, rubber or the like.

The heat transfer fluid can be provided to the temperature control mechanism 102 from an external source (not shown) via an inlet 710 that is fluidly coupled with the passageways 708. The external source can modulate the temperature of the heat transfer fluid provided to the temperature control mechanism 102 based on the temperature needs of the battery cell 100. Thus, the temperature control mechanism 102 can be used to modulate a temperature of the battery cell 100. In examples, the external source can also include a heat exchanger such that, in examples where the heat transfer fluid is drawing heat from the battery cell 100, i.e., cooling the battery cell 100, the heat exchanger can function to extract heat from the heat transfer fluid when the heat transfer fluid exits the temperature control mechanism 102 and the passageways 708 via an outlet 712 that is fluidly coupled with the passageways 708. The heat transfer fluid can be repeatedly used to extract heat from the battery cell 100. Thus, the temperature control mechanism 102 can be used to decrease the temperature of the battery cell 100, such as prior to a mode where an output of the battery cell 100 is being provided to a load, i.e., during takeoff of an aeronautical vehicle.

In addition to cooling, as noted above, the temperature control mechanism can be used to add heat to the battery cell 100. To further illustrate, if a temperature of the battery cell 100 needs to be increased, such as during a charging process, a temperature of the heat transfer fluid can be increased via the external source and the heat exchanger and then provided to the temperature control mechanism 102. As such, the heat transfer fluid, via the temperature control mechanism 102, can work to increase the temperature of the battery cell 100.

Figure 8:
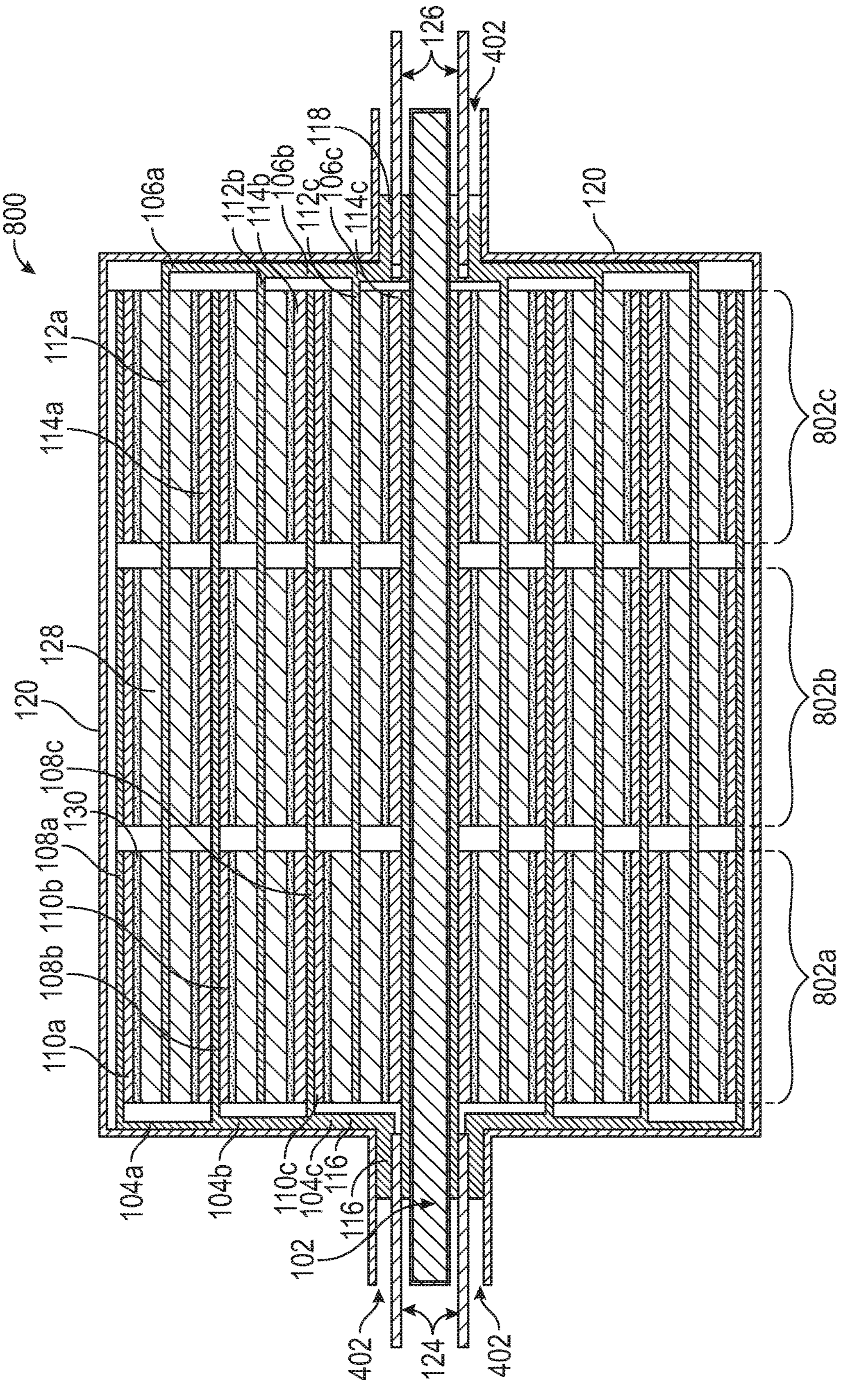
FIG. 8 illustrates a battery cell, according to some examples.

The battery cell 100 shown with reference to FIG. 1 can be a liquid lithium metal or lithium-ion system. In some examples, the battery cell can be a solid-state battery, as shown with reference to FIG. 8 and a battery cell 800. The battery cell 800 can include a plurality of electrode stacks 802*a*-802*c* each having the configuration, i.e., the anode 104 and the cathode 106, etc., as described above. The battery cell 800 can include all the features of the battery cell 100. Moreover, the discussion with regards to FIGS. 1 and 4-7 above are equally applicable to FIG. 8.

Figure 9:
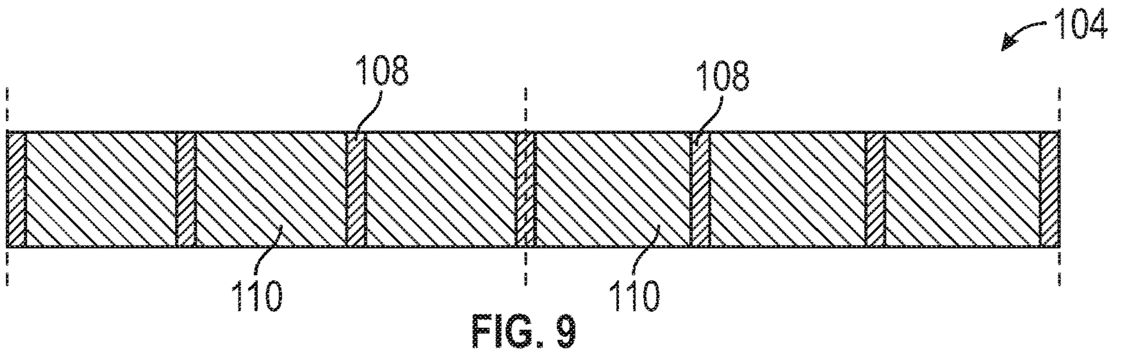
FIGS. 9 and 10 illustrate the formation of anodes and cathodes for the battery cell of FIG. 8, according to some examples.

Each of the anodes 104 can include a single current collector 108 (generically shown as the current collecting portion 108 in FIG. 9) along with active areas 114 in FIG. 9), which can be formed as a coating on the current collecting portion 108 as detailed above and as more clearly shown with reference to FIG. 9. As can be seen with reference to FIG. 9, the anode 104 can include a single current collector 108 where a plurality of the active areas 114 can be formed on the current collecting portion 108 as described above.

In addition to the techniques described above, the active areas 114 can be formed by skip coating the material for the active area 114, such as graphite or a deposition of lithium, onto the current collector portion 108 on one or both sides. In these examples, the active area 114 can have another layer, the solid-state electrolyte/separator, for features in the anode 104. Once the structure in FIG. 9 is formed and dried, the structure can be slit such that the appropriate number of collection portions 108 and active areas 114 can be obtained. Using the slit structure, stacking can occur to achieve the structure shown with reference to FIG. 8 and the battery cell 800.

Figure 10:
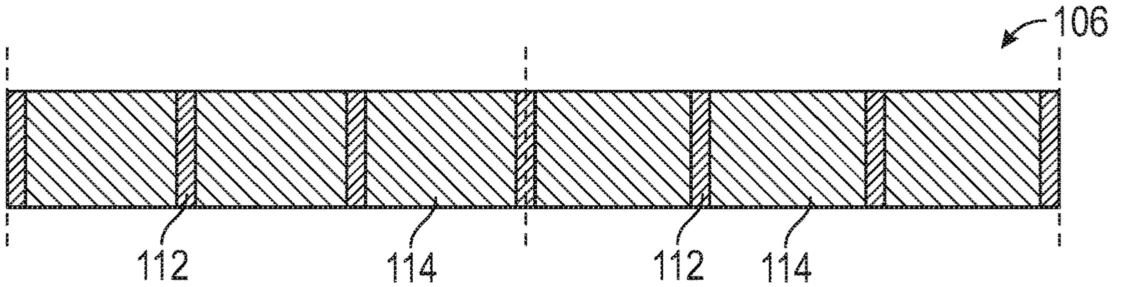

Each of the cathodes 106 can include the current collector portion 112 along with the active area 117, which can be formed as a coating on the current collecting portion 112, as more clearly shown with reference to FIG. 10. As can be seen with reference to FIG. 10, similar to the anode 104, the cathodes a plurality of active material layers 117 can be coated onto the each current collecting portion 112 on one or both sides.

Additionally, the active area 117 can be formed of any type of cathode material that has high energy density, high power density, and a long cycle life. Furthermore, the active area 117 can be formed by skip coating the material for the active area 117 onto the current collector portion 112. Once the structure in FIG. 10 is formed and dried, the structure can be slit such that the appropriate number of collection portions 112 and active areas 117 can be obtained. Using the slit structure, stacking can occur to achieve the structure shown with reference to FIG. 8 and the battery cell 800. In addition, as may be seen with reference to FIG. 8, the temperature control mechanism 102 can be disposed between the stacks and centrally located within the battery cell 800.

Figure 11:
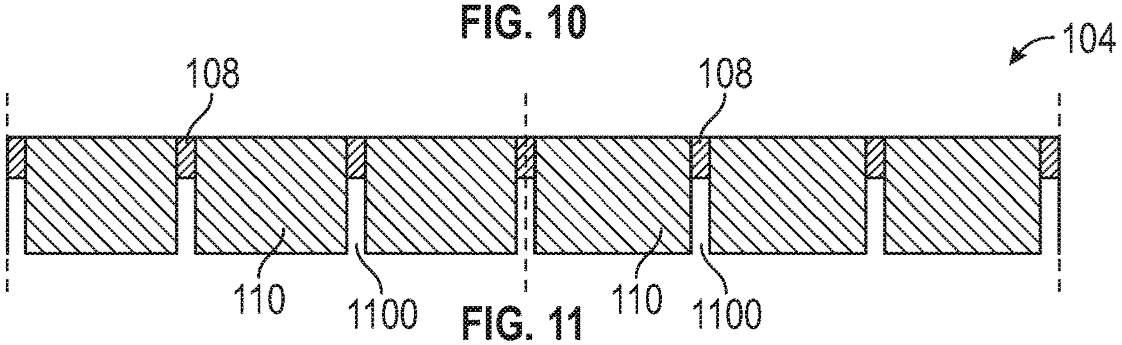
FIGS. 11 and 12 illustrate the formation of anodes and cathodes for the battery cell of FIG. 8, according to some examples.
Figure 12:
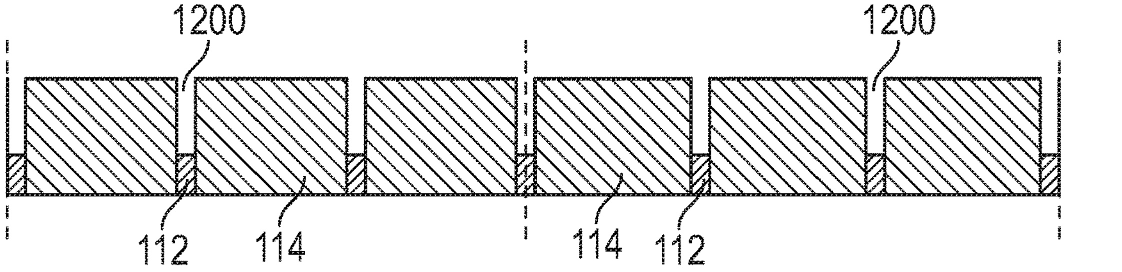

In addition to using slitting and skip coating techniques to form the anodes 104 and cathodes 106, a punch through process can be used to form the anodes 104 and the cathodes 106, as shown with reference to FIGS. 11 and 12. After formation of the anodes 104 along with the active area 114 by costing the material for the active area 114 onto the current collecting portion 108 using the techniques discussed above, punch throughs 1100 can be formed in the anode 104. Once the punch throughs 1100 are formed, the current collecting portion 108 can be formed in the punch throughs 1100.

Regarding the cathodes 106, a similar process can be used. More specifically, the active area 117 can be formed by coating the material for the active area 117 onto the current collector portion 112. Afterwards, punch throughs 1200 can be formed in the cathode 106. Once the punch throughs 1200 are formed, the current collecting portion 112 can be formed in the punch throughs 1200. Using the anode in FIG. 11 with the cathode in FIG. 12 prevents the bare metallic current collectors 108 and 112 from coming into contact after stacking, thereby potentially shorting the cell.

Figure 13:
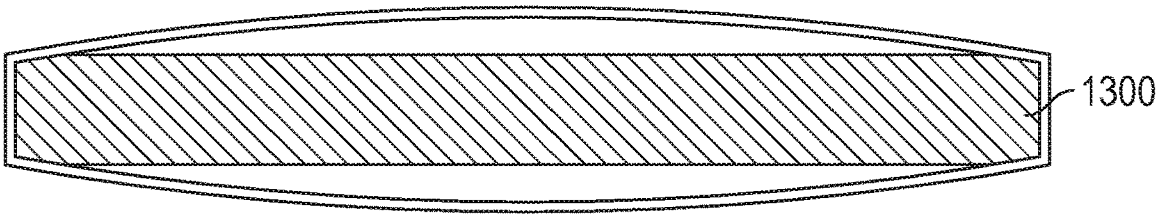
FIG. 13 illustrates a temperature control mechanism, according to alternative examples.

In examples, the temperature control mechanism 102 can have any type of configuration. Now making reference to FIG. 13, a temperature control mechanism 1300 is shown, Here, the temperature control mechanism 1300 has a semi-ovoid configuration as opposed to a substantially planar configuration, as shown with reference to FIGS. 1-11, Moreover, the temperature control mechanism 1300 can have the same features as the temperature control mechanism 102 described above and in particular with reference to FIGS. 4-7. In addition, the discussion with regards to FIGS. 1-11 above are equally applicable to the temperature control mechanism 1300. The temperature control mechanism 1300 can be formed from a flexible material that can flex upon the application of a fluidic pressure. Examples of materials that can be used can include any type of polymer or elastomer that is capable of flexing.

The ovoid configuration of the temperature control mechanism 1300 allows the temperature control mechanism 1300 to apply a pressure within the battery cells 100 and 800. In examples, the flow pressure of the temperature control mechanism 1300 can be modulated in order to control a pressure applied within the battery cells 100 and 800. The flow pressure can relate to a heat transfer fluid used for heating and/or cooling. In addition, any other type of fluid can be used to modulate a pressure exerted by the temperature control mechanism 1300. Thus, in addition to modulating a temperature of the battery cells 100 and 800 as detailed above, the temperature control mechanism 1300 can have the added benefit of modulating a pressure within the battery cells 100 and 800 as discussed above.

Figure 14:
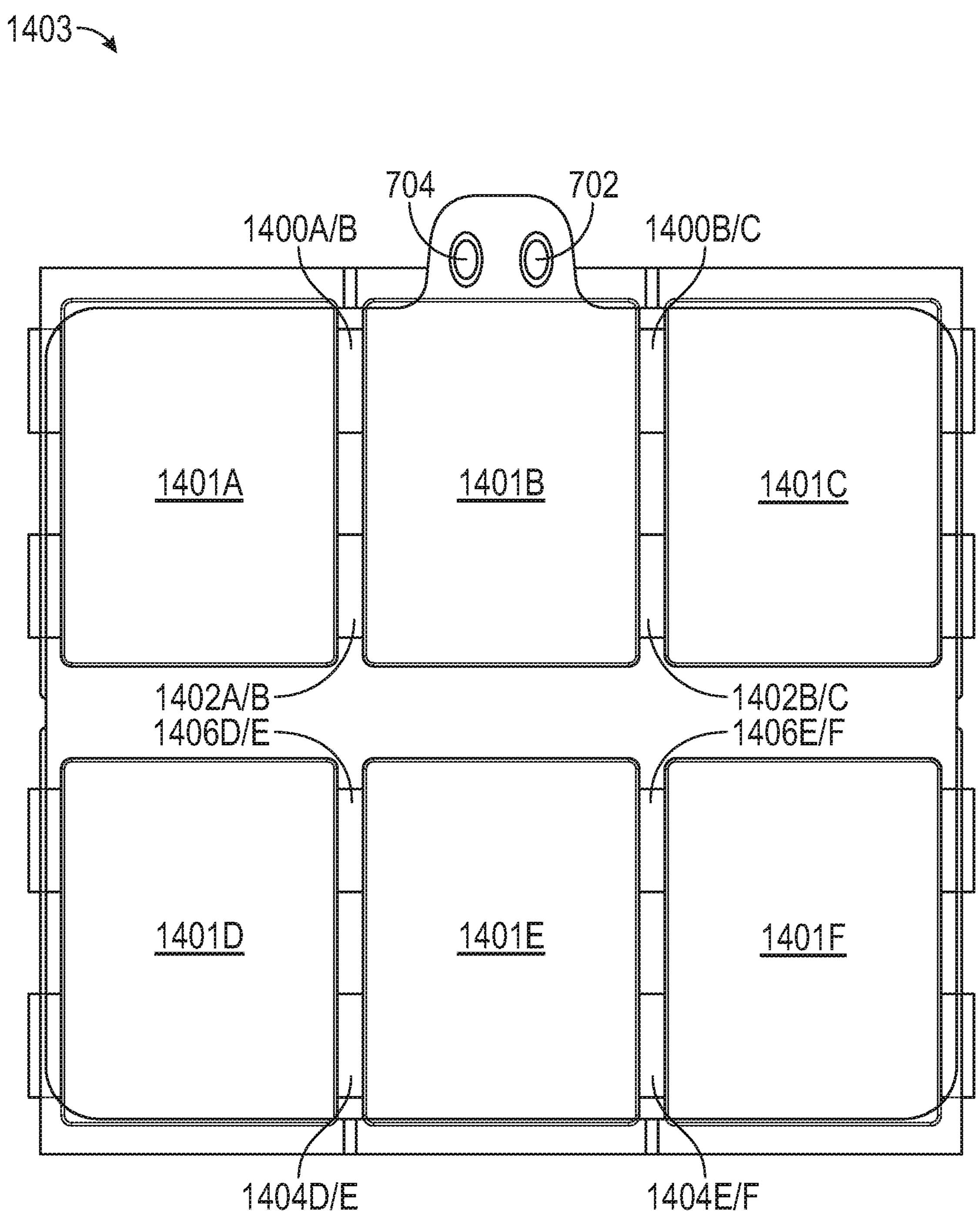
FIGS. 14-16 show the coupling of disparate battery cells via tabs, according to some examples.

In examples, battery cells can couple with each other via tabs, as shown with reference to FIG. 14, which illustrates a battery interconnection system 1403. Battery cells 1401A-1401C can couple with each other via tabs 1400A/B, 1400B/C, 1402A/B, and 1402A/B. The tabs 1400A/B and 1400B/C can correspond to either positive or negative leads for the battery leads for the battery cells 1401A-1401C while the tabs 1402A/B and 1402A/B can correspond to the other of positive or negative leads (i.e., if the tabs 1400A/B and 1400B/C correspond to a positive lead, then the tabs 1402A/B and 1402A/B can correspond to a negative lead, and vice versa) for the battery leads for the battery cells 1401A-4401C. The battery cell 1401A can couple with the battery cell 1401B via the tab 1400A/B and the tab 1402A/B. In examples, the tabs 1400A/B and 1402A/B can incorporate the structure of the tab 500 and can include the same configuration as the tab 500.

Figure 15:
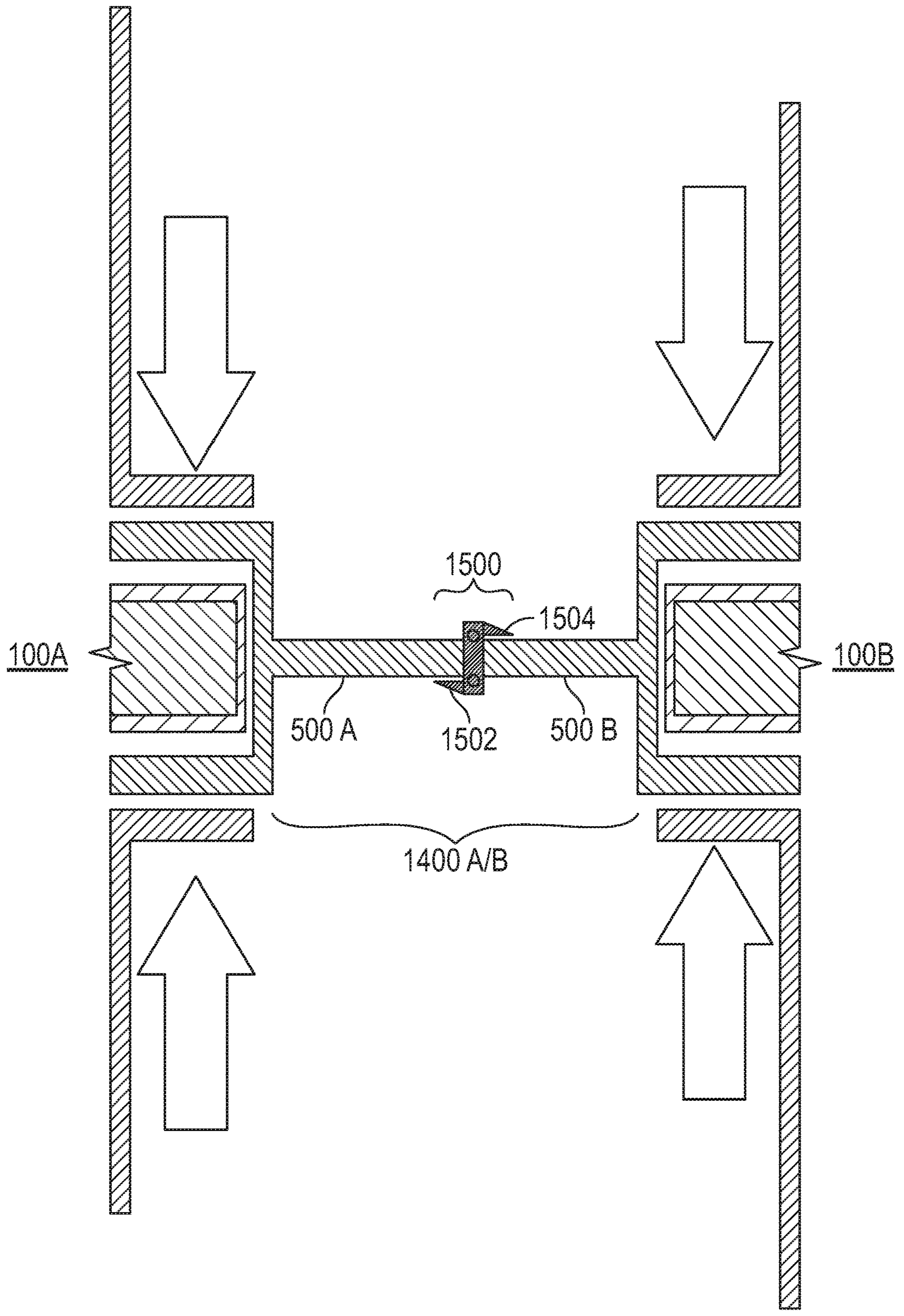

To further illustrate the formation of the tab 1400A/B, making reference to FIG. 15, the tab 1400A/B can be formed by coupling a tab 500A of the battery cell 1401A with a tab 500B of the battery cell 1401B. Each of the tabs 500A and 500B can have the configuration of the tab 500 described above. The tab 500A can be coupled with the tab 500B at an area 1500 with any type of mechanical bonding. In some examples, a portion 1502 of the tab 500A can overlap with a portion 1504 of the tab 500B at the area 1500. The overlapping portions 1502 and 1504 can be bonded as described herein. In addition, the tab 500A can be fused with the tab 500B using ultrasonic welding, laser welding, resistance welding, or the like at the area 1500. In examples where the tab 1400A/B corresponds to a positive lead, the tabs 500A and 500B can be formed from the cathode 106. In examples where the tab 1400A/B corresponds to a negative lead, the tabs 500A and 500B can be formed from the anode 104. It should be noted that the tab 1400B/C can be formed in a manner similar to that discussed with reference to the tab 1400A/B.

Figure 16:
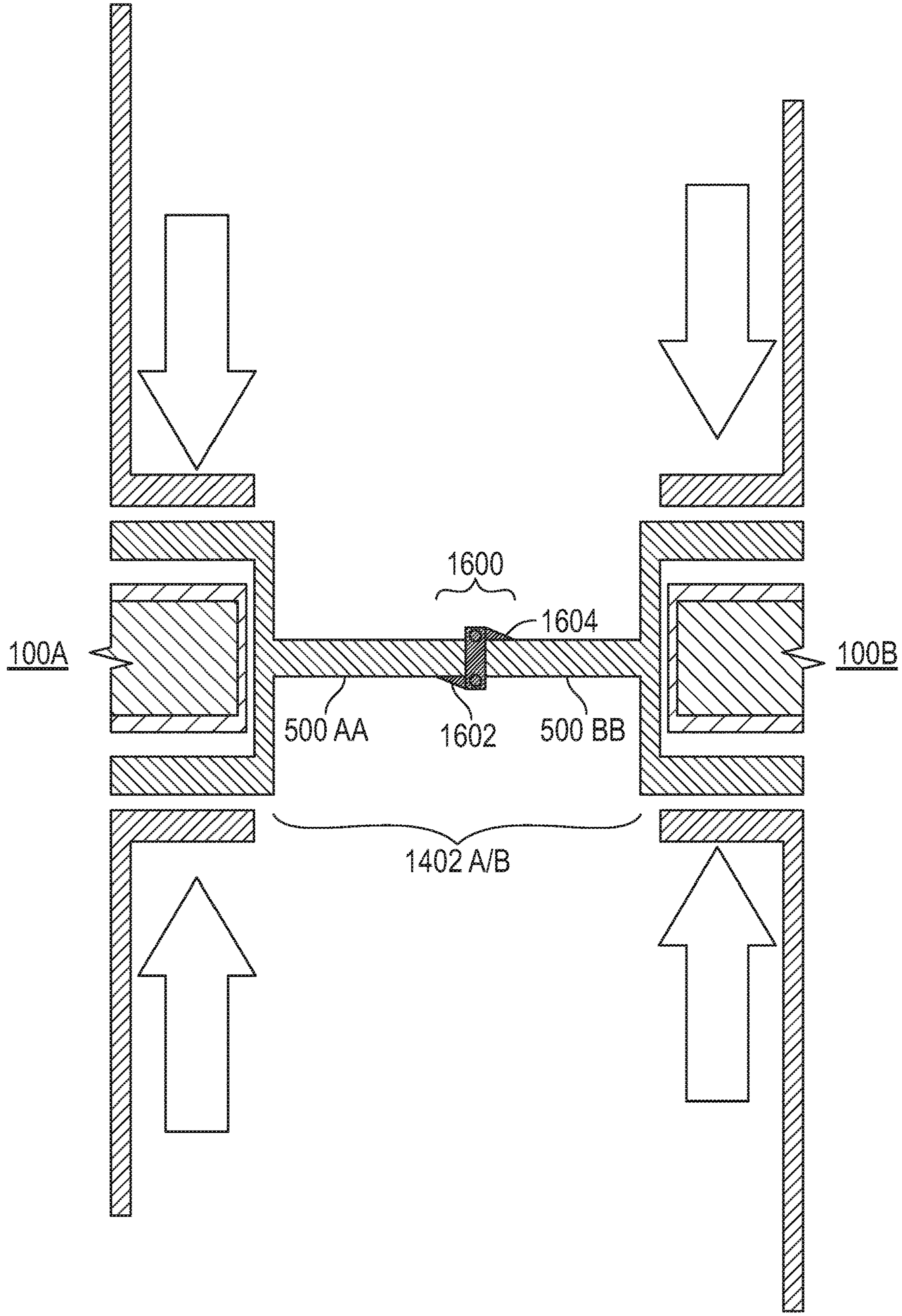

Making reference to FIG. 16, similarly, the tab 1402A/B can be formed in the same manner as the tab 1400A/B as described with reference to FIG. 15. The tab 1402A/B can be formed by coupling a tab 500AA of the battery cell 1401A with a tab 500BB of the battery cell 1401B. The tab 500AA can be coupled with the tab 500BB at an area 1600 with any type of mechanical bonding. In some examples, a portion 1602 of the tab 500AA can overlap with a portion 1604 of the tab 500BB at the area 1600. The overlapping portions 1602 and 1604 can be bonded as described herein. In addition, the tab 500AA can be fused with the tab 500BB using ultrasonic welding, laser welding, resistance welding, or the like at the area 1600. Where the tab 1402A/B corresponds to a positive lead, the tabs 500AA and 500BB can be connected to the cathode 106. Where the tab 1402A/B corresponds to a negative lead, the tabs 500AA and 500BB can be connected to the anode 104. In examples, the tabs 1402B/C can be formed in a manner similar to that discussed with reference to the tabs 1402A/B.

Battery cells 1401D-1401F can couple with each other via tabs 1404D/E, 1404E/F, 1406D/E, and 1406E/F. The tabs 1404D/E and 1404E/F can correspond to either positive or negative leads for the battery leads for the battery cells 1401D-1401F while the tabs 1406D/E and 1406E/F can correspond to the other of positive or negative leads (i.e.; if the tabs 1404D/E and 1404E/F correspond to a positive lead, then the tabs 1406D/E and 1406E/F can correspond to a negative lead, and vice versa) for the battery leads for the battery cells 1401D-1401F. The battery cell 1401D can couple with the battery cell 1401E via the tabs 1404D/E and 1406D/E. The tabs 1404D/E and 1406D/E can be formed similar to the tab 500 and have the same configuration as the tab 500 as described with reference to FIG. 5. Furthermore, the tabs 1404D/E and 1406D/E can be formed between the battery cells 1401D and 1401E in a manner similar to that described with reference to FIGS. 15 and 16 and the battery cells 100A and 100B. Similarly, the tabs 1404E/F and 1406E/F can be formed between the battery cells 1401E and 1401F in a manner similar to that described with reference to FIGS. 15 and 16 and the battery cells 1401A and 1401B.

In the examples shown with reference to FIG. 14, each of the battery cells 1401A-1401F are disposed within their own pouch laminates, such as the pouch laminate 120 described above. However, in further examples, each of the battery cell electrode stacks (or windings) can share a single pouch laminate, such as being disposed in a single pouch laminate 120. Here, each of the battery cells can have a configuration similar to the battery cell 800 where the anodes 104 and the cathodes 106 are formed using punch through processing as described above with reference to FIGS. 9 and 10. Each of the battery cells 800 can have tabs similar to the tabs 500, 500A, 500AA, 500B, and 500BB described above. Moreover, each of the battery cells 800 can electrically couple to each other via the tabs 500, 500A, 500AA, 500B, and 500BB described above. Here, the positive leads can form electrical couplings via cathodes, such as the cathode 106 described above. In addition, the negative leads can form electrical couplings via anodes, such as the anodes 104 described above.

The battery cells 1401A-1401F can have the configuration described above with reference to the battery cell 100 and in FIGS. 1-13. However, it should be pointed out that the battery cells, electrode stacks (or windings) 1401A-1401F can also have the configuration described above with reference to the battery cell 800. Moreover, some of the battery cells, electrode stacks, (or windings) 1401A-1401F can have the configuration of the battery cell 100 while others of the battery cells, electrode stacks (or windings) 1401A-1401F can have the configuration of the battery cell 800. Each of the battery cells 1401A-1401F can include temperature control mechanisms as described herein, or the battery interconnection system 1403 can include a single temperature control mechanism as described herein where each of the battery cells 1401A-1401F can be disposed on the temperature control mechanism. Furthermore, while only two rows of three battery cells are shown, examples envision any number of rows. Moreover, while only three cells are shown in a row, a single row or multiple rows can have more than three cells.

Figure 17:
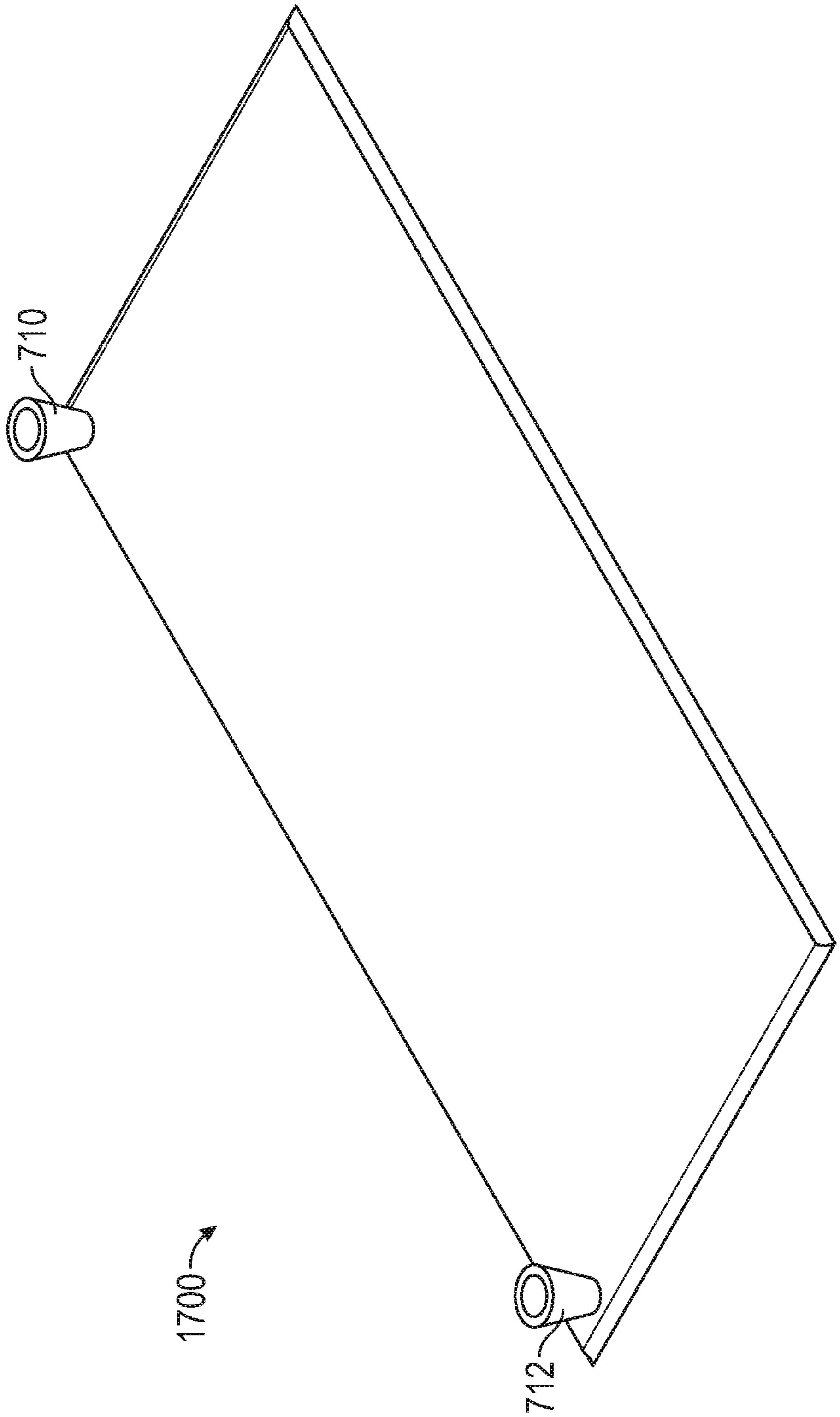
FIG. 17 illustrates a temperature control mechanism for the battery cell of FIG. 1, according to some examples.

Now making reference to FIG. 17, an alternative example of a temperature control mechanism 1700 is shown. Here, the temperature control mechanism 1700 includes the inlet 710 and the outlet 712.

Alternative examples implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or MID), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the Figures and claims, modifications and changes can be made to the preferred embodiments of the invention without departing from the scope of this invention defined in the following claims.

The invention claimed is:

1. A battery interconnection system comprising:
- a first battery cell, the first battery cell including:
  - at least one electrically positive tab;
  - at least one electrically negative tab; and
  - a first temperature control mechanism, the first temperature control mechanism including two first temperature control mechanism hollow plates coupled with each other at respective edges of the two first temperature control mechanism hollow plates, wherein:
    - a first sealed hollow cavity is formed by the two first temperature control mechanism hollow plates;
    - one of the two first temperature control mechanism hollow plates has first passages disposed therethrough; and
    - the first passages are configured to allow passage of a heat transfer fluid into the first sealed hollow cavity; and
- a second battery cell, the second battery cell comprising:
  - at least one electrically positive tab;
  - at least one electrically negative tab; and
  - a second temperature control mechanism, the second temperature control mechanism including two second temperature control mechanism hollow plates coupled with each other at respective edges of the two second temperature control mechanism hollow plates, wherein:
    - a second sealed hollow cavity is formed by the two second temperature control mechanism hollow plates;
    - one of the two second temperature control mechanism hollow plates has second passages disposed therethrough; and
    - the second passages are configured to allow the passage of the heat transfer fluid into the second sealed hollow cavity;
  - the at least one electrically positive tab of the first battery cell couples with the at least one electrically positive tab of the second battery cell;
  - the at least one electrically negative tab of the first battery cell couples with the at least one electrically negative tab of the second battery cell; and
  - the first battery cell is separate from the second battery cell.

2. The battery interconnection system of claim 1, wherein:
- the first battery cell includes a cathode electrically coupled with the at least one electrically positive tab of the first battery cell and the second battery cell includes a cathode electrically coupled with the at least one electrically positive tab of the second battery cell; and
- the first battery cell includes an anode electrically coupled with the at least one electrically negative tab of the first battery cell and the second battery cell includes an anode electrically coupled with the at least one electrically negative tab of the second battery cell.

3. The battery interconnection system of claim 2, wherein;
- each of the first battery cell cathode and the second battery cell cathode is formed with a punch through process; and
- each of the first battery cell anode and the second battery cell anode is formed with a punch through process.

4. The battery interconnection system of claim 3, wherein each of the first battery cell and the second battery cell are disposed within a single pouch laminate.

5. The battery interconnection system of claim 4, wherein the single pouch laminate includes a sealant layer formed on an inside surface thereof and the first temperature control mechanism and the second temperature control mechanism each have a CPP layer disposed on sides thereof and the single pouch laminate is fused with the first temperature control mechanism CPP layer and the second temperature control mechanism CPP layer thereby forming a hermetic seal.

6. The battery interconnection system of claim 1, wherein the first battery cell is disposed within a first pouch laminate and the second battery cell is disposed with a second pouch laminate.

7. The battery interconnection system of claim 6, wherein:
- each of the first pouch laminate and the second pouch laminate include a co-polymer propylene and polyethylene (CPP) layer formed on an inside surface thereof and the first temperature control mechanism and the second temperature control mechanism each have a CPP layer disposed on sides thereof; and
- the first pouch laminate CPP layer and second pouch laminate CPP layer are fused with the first temperature control mechanism CPP layer and the second temperature control mechanism CPP layer thereby forming hermetic seals.

8. The battery interconnection system of claim 1, wherein the first battery cell and the second battery cell are in parallel.

9. A battery interconnection system comprising:
- a first battery cell, the first battery cell including:
  - at least one electrically positive tab;
  - a cathode electrically coupled with the at least one electrically positive tab;

at least one electrically negative tab;

an anode electrically coupled with the at least one electrically negative tab; and a first temperature control mechanism, the first temperature control mechanism including two first temperature control mechanism hollow plates coupled with each other at respective edges of the two first temperature control mechanism hollow plates, wherein:

a first sealed hollow cavity is formed by the two first temperature control mechanism hollow plates;

one of the two first temperature control mechanism hollow plates has first passages disposed therethrough; and the first passages are configured to allow passage of a heat transfer fluid into the first sealed hollow cavity;

a second battery cell, the second battery cell comprising:

at least one electrically positive tab;

a cathode electrically coupled with the at least one electrically positive tab;

at least one electrically negative tab;

an anode electrically coupled with the at least one electrically negative tab of the second battery cell; and a second temperature control mechanism, the second temperature control mechanism including two second temperature control mechanism hollow plates coupled with each other at respective edges of the two second temperature control mechanism hollow plates, wherein:

a second sealed hollow cavity is formed by the two second temperature control mechanism hollow plates;

one of the two second temperature control mechanism hollow plates has second passages disposed therethrough; and the second passages are configured to allow the passage of the heat transfer fluid into the second sealed hollow cavity;

the at least one electrically positive tab of the first battery cell couples with the at least one electrically positive tab of the second battery cell;

the at least one electrically negative tab of the first battery cell couples with the at least one electrically negative tab of the second battery cell; and the first battery cell is separate from the second battery cell.

10. The battery interconnection system of claim 9, wherein:

each of the first battery cell cathode and the second battery cell cathode is formed with a punch through process; and each of the first battery cell anode and the second battery cell anode is formed with a punch through process.

11. The battery interconnection system of claim 10, wherein each of the first battery cell and the second battery cell are disposed within a single pouch laminate, wherein the single pouch laminate includes a co-polymer propylene and polyethylene (CPP) layer formed on an inside surface thereof and the first temperature control mechanism and the second temperature control mechanism each have a CPP layer disposed on sides thereof and the single pouch laminate is fused with the temperature control mechanism CPP layer thereby forming a hermetic seal.

* * * * *